United States Patent
Moran, Jr.

(10) Patent No.: US 9,049,852 B1
(45) Date of Patent: Jun. 9, 2015

(54) SPOON FISHING LURE AND METHOD OF MAKING THE SAME

(71) Applicant: John Denis Moran, Jr., Laguna Vista, CA (US)

(72) Inventor: John Denis Moran, Jr., Laguna Vista, CA (US)

( * ) Notice: Subject to any disclaimer, the term of this patent is extended or adjusted under 35 U.S.C. 154(b) by 265 days.

(21) Appl. No.: 13/913,081

(22) Filed: Jun. 7, 2013

Related U.S. Application Data

(60) Provisional application No. 61/661,536, filed on Jun. 19, 2012.

(51) Int. Cl.
*A01K 85/00* (2006.01)
*A01K 85/14* (2006.01)

(52) U.S. Cl.
CPC .................................. *A01K 85/14* (2013.01)

(58) Field of Classification Search
USPC ...................... 43/42.5, 42.52, 42.39
See application file for complete search history.

(56) References Cited

U.S. PATENT DOCUMENTS

| | | | | |
|---|---|---|---|---|
| 2,557,599 A * | 6/1951 | Dunmire | ...................... | 43/42.52 |
| 2,624,147 A * | 1/1953 | Round | ............................ | 43/42.5 |
| D228,553 S * | 10/1973 | Sanderson | .................... | D22/131 |
| 4,479,323 A * | 10/1984 | Burr | .............................. | 43/42.5 |
| 4,713,906 A * | 12/1987 | Distaffen | ....................... | 43/42.5 |
| 4,936,041 A * | 6/1990 | Couture | ....................... | 43/42.15 |
| 5,077,931 A * | 1/1992 | Marshall | ...................... | 43/42.52 |
| 5,279,065 A * | 1/1994 | Drury, Jr. | ..................... | 43/42.52 |
| 6,301,823 B1 * | 10/2001 | Monticello et al. | ............ | 43/42.5 |
| 6,493,983 B1 * | 12/2002 | Lewko | .............................. | 43/42.5 |
| 8,650,797 B2 * | 2/2014 | Sugita et al. | ................. | 43/42.32 |
| 8,782,945 B2 * | 7/2014 | Jones | .............................. | 43/42.5 |
| 2014/0150329 A1 * | 6/2014 | Waldroup | .................... | 43/42.25 |

\* cited by examiner

*Primary Examiner* — Christopher P Ellis
(74) *Attorney, Agent, or Firm* — Plager Schack LLP

(57) ABSTRACT

A spoon fishing lure is configured to catch fish in shallow water without becoming entangled in grass. The spoon fishing lure includes a body which includes a raised right portion immediately adjacent to front central portion and rear central portion and a lowered left portion. The body is shaped to efficiently travel through the grass in the shallow water. A hook assembly mechanically coupled to the body and further comprising an eye immediately adjacent to a shank which is further immediately adjacent to a hook. The eye can be tethered to a line and the hook can catch the fish. The body is made of a semi-buoyant material and the lowered left portion attached to an egg sinker causing the body to sink slightly in the shallow water without precision reeling making the spoon fishing lure easier to use.

6 Claims, 3 Drawing Sheets

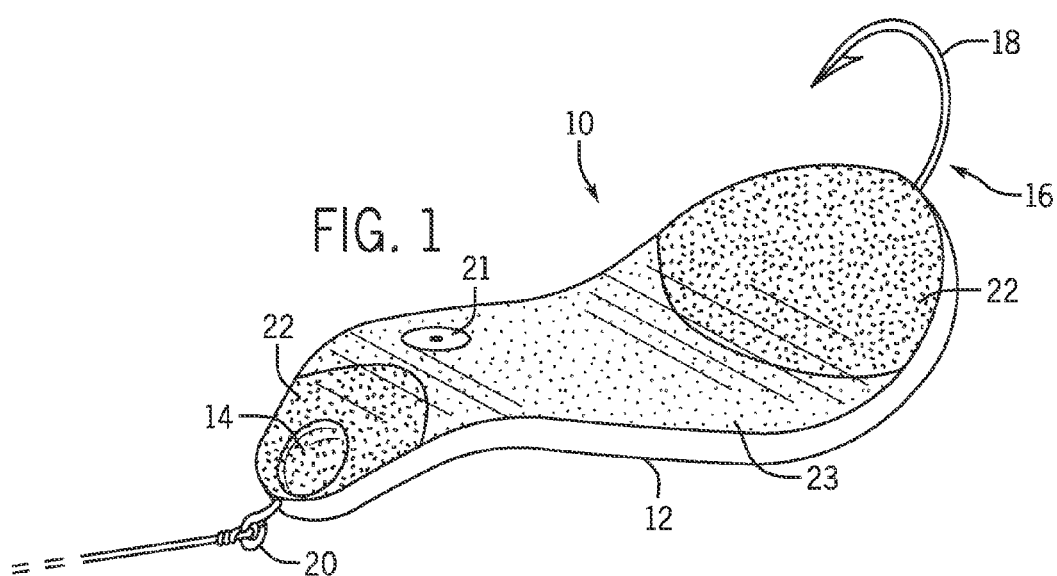
FIG. 1
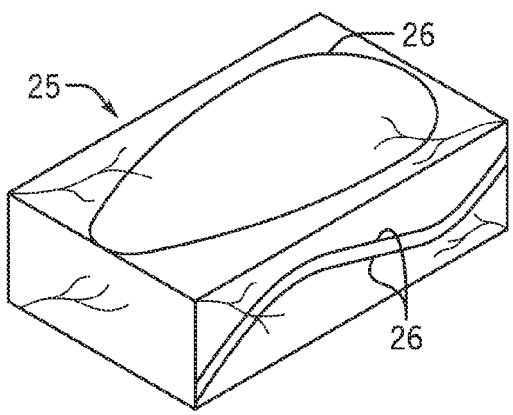
FIG. 2
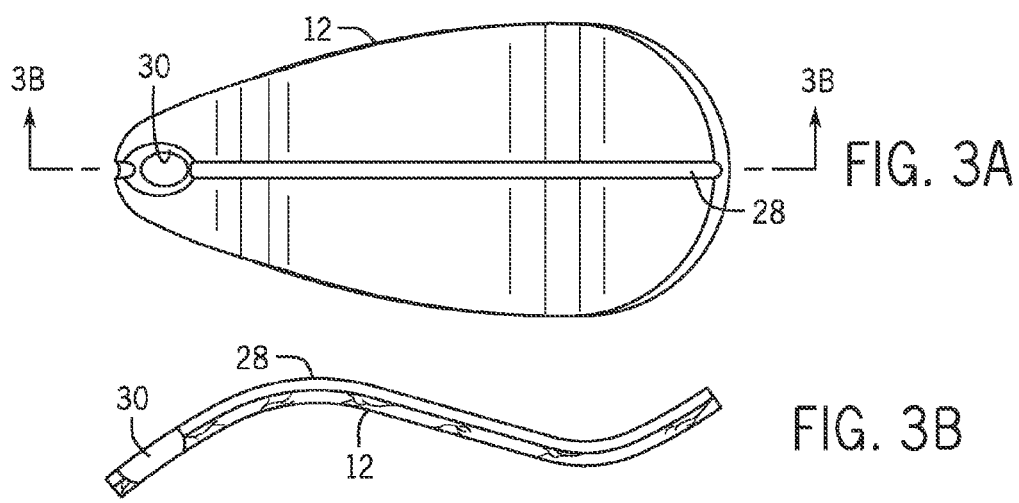
FIG. 3A
FIG. 3B

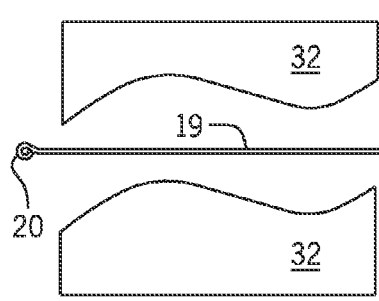
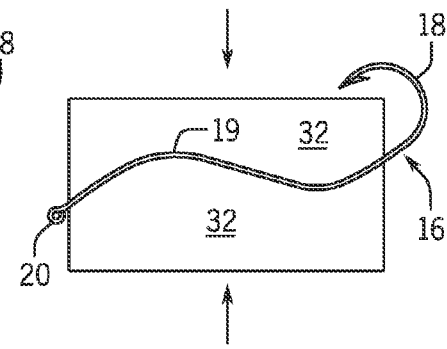
FIG. 4A    FIG. 4B
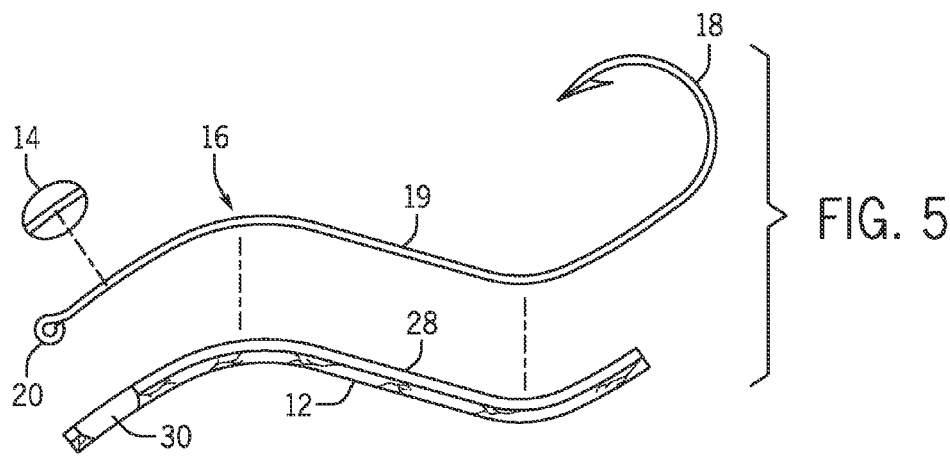
FIG. 5
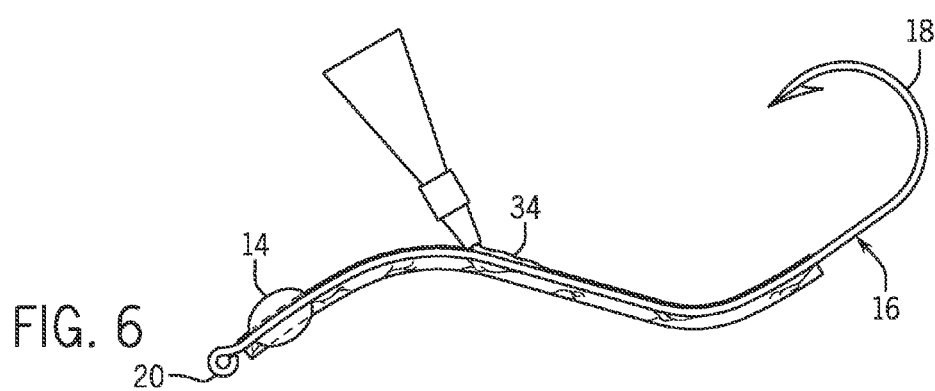
FIG. 6

SPOON FISHING LURE AND METHOD OF MAKING THE SAME

RELATED APPLICATION

This application claims priority to provisional patent application U.S. Ser. No. 61/661,536 filed on Jun. 19, 2012, the entire contents of which is herein incorporated by reference.

BACKGROUND

The embodiments herein relate generally to devices used to catch fish.

When catching fish there are several advantages of using a lure as opposed to using bait: Lures are less messy than bait. Lures gut hook fewer fish (gut hooking is when the fish takes the hook deeply, or even completely swallows the hook). Lures allow the fisher to cover more water, even from shore or a pier. The fisher can target the species you are after more efficiently with lures, and lures are easy to change out.

There are at least seven kinds of fishing lures: jigs, spinners, spoons, soft plastic baits, plugs, spinerbaits, and flies. A jig has a weighted lead head, comes in every size and color and can be dressed in feathers, hair, a soft plastic grub, or with bait. A spinner is a metal shaft with spinning blade. Soft plastic baits are created by pouring liquid plastic into a mold and adding dyes, metallic flakes, or scents. These can resemble the natural forage of fish, like worms, crawfish, lizards or frogs. Plugs are constructed from hollow plastic or wood to resemble baitfish, frogs or other prey. They usually sport two or three treble hooks. A spinnerbait is an awkward looking fishing lure, consisting of a safety-pin like wire attached to a lead head body. The body usually is dressed with a rubber skirt and the arm with one or two metallic blades like those seen on spinners. Flies are very light lures that imitate insects in various stages of their life cycle, or other natural prey such as baitfish, leeches, hoppers or even mice and frogs. Prior to embodiments of the disclosed invention a spoon was a curved metal lure.

Prior to the disclosed invention, conventional spoons were made of metal for largely historical reasons, the first spoons were literally broken off ends of a spoon. This is because metal sank and could be configured to look like a spoon that reflected light and would be easy to catch fish. There was an attempt to make a wooden spoon lure briefly in the 1920's. See R. Lewis, *Classic Fishing Lures: Identification and Price Guide*, p. 293 (2011). Paul Bunyan Company made "The Dinky" a 1/20 ounce wooden spoon with a feather hackle or fly in four colors. This project was scrapped after a year because making curved wood that sank was impossible for The Dinky. Embodiments of the present invention solve this problem.

Metal spoons are heavy and sink too quickly for fish to see and track the metal spoon. Metal spoons must be worked too quickly in shallow water and this rapid movement does not allow fish to see or track them. Metal spoons, if worked too slowly, become ensnarled in grass. Metal spoons, if worked too fast, come to the surface and become ineffectual. Fishing in shallow, grassy waters ranging from four to eight inches was difficult. Metal spoons become ensnarled and fouled. Embodiments of the present invention solve these problems.

SUMMARY

A spoon fishing lure is configured to catch fish in shallow water without becoming entangled in grass. The spoon fishing lure includes a body which includes a raised right portion immediately adjacent to front central portion and rear central portion where both the front central portion and the rear central portion are immediately adjacent to a lowered left portion. The body is shaped to efficiently travel through the grass in the shallow water. The body is shaped to efficiently travel through the grass in the shallow water. A hook assembly mechanically coupled to the body and further comprising an eye immediately adjacent to a shank which is further immediately adjacent to a hook. The eye can be tethered to a line and the hook can catch the fish. The body is made of a semi-buoyant material and the lowered left portion attached to an egg sinker causing the body to sink slightly in the shallow water without precision reeling making the spoon fishing lure easier to use.

In some embodiments, the raised right portion and the lowered left portion are a first color. The front central portion is a second color. The rear central portion is a third color to attract the fish in the shallow water. The body can be made from wood.

A method of making a spoon fishing lure that can attract and catch fish in shallow water involves the following steps. First a user draws an S-shaped first cut line on a first side of a block of material. Next the user draws an egg shaped cut line on a second side of the block of material. The user then cuts along the S-shaped first cut line making two blocks. The user can then form a hook assembly with the two blocks. The user next, creates a body by cutting along the egg shaped cut line on the second side of the block of material. After this the user, cuts a groove into the body sufficiently wide to accommodate the hook assembly. The user can then bore a pocket into the body sufficiently large to accommodate a weight. Next, the user inserts the weight onto the hook assembly and inserting the hook assembly into the groove such that the weight fits into the pocket. After this, the user seals the hook assembly into the body. In some embodiments the body can be painted.

BRIEF DESCRIPTION OF THE FIGURES

The detailed description of some embodiments of the invention will be is made below with reference to the accompanying figures, wherein like numerals represent corresponding parts of the figures.

FIG. 1 is a perspective view of an embodiment of the invention.

FIG. 2 is a perspective view of the block from which an embodiment the invention is made.

FIG. 3A is a top plan view of the blank of an embodiment of the invention made from FIG. 2.

FIG. 3B is a cross-sectional view taken on line 3B-3B of FIG. 3A.

FIG. 4A is a side elevation view of an embodiment of the hook blank and the forming components before forming the hook.

FIG. 4B is a side elevation view showing the forming of an embodiment of the hook.

FIG. 5 is an exploded side elevation view with parts in section.

FIG. 6 is a side sectional view showing the application of epoxy to mount the hook to the lure.

DETAILED DESCRIPTION OF CERTAIN EMBODIMENTS

Figure 7A:
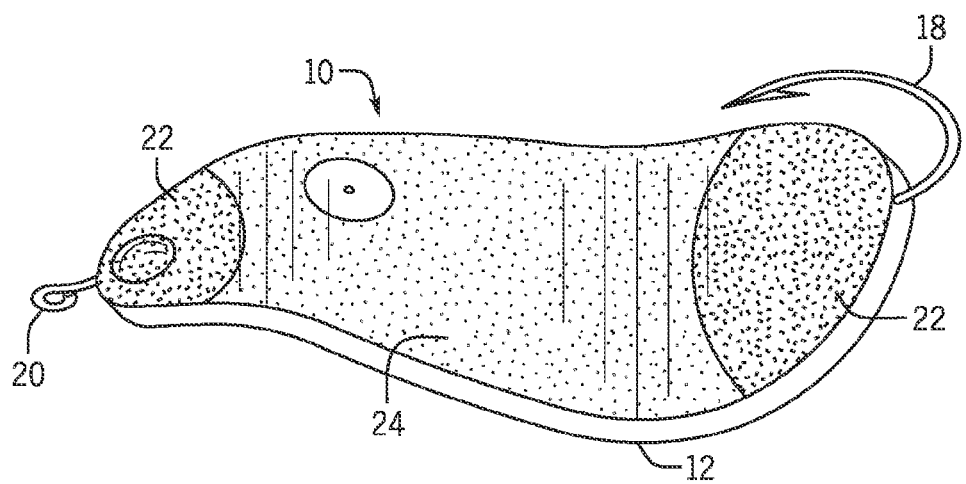
FIG. 7A is a top perspective view of an embodiment of the invention.
Figure 7B:
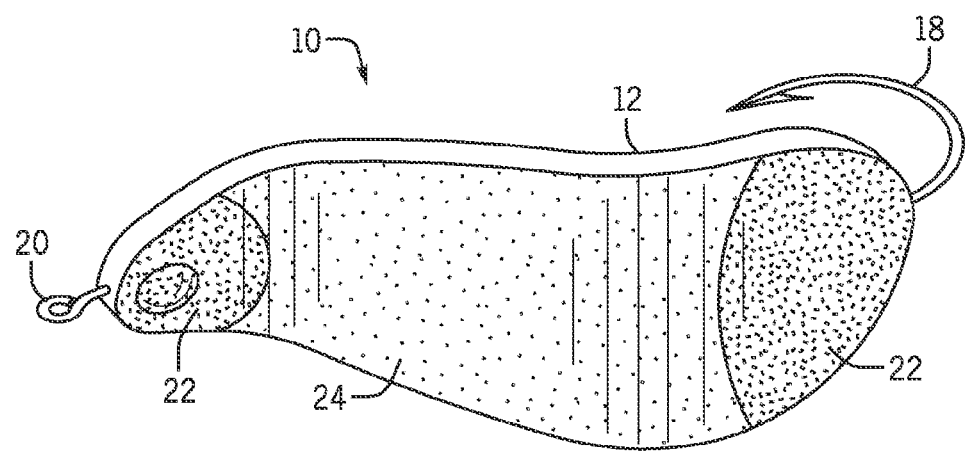
FIG. 7B is a bottom perspective view of an embodiment of the invention.

By way of example, and referring to FIG. 1, FIG. 7A and FIG. 7B, one embodiment of spoon fishing lure comprises body 12 which includes raised right portion 22A immediately adjacent to front central portion 23 and rear central portion 24. Both front central portion 23 and rear central portion 24 are immediately adjacent to lowered left portion 22B. In some embodiments, there is a single central portion. This teaches away from The Dinky which utilized a single curved central portion. The Dinky would get stuck in grass, but body is shaped to efficiently travel through grass in shallow water.

Raised right portion 22A comprises a wide cross section when compared to lowered left portion 22B. Raised right portion 22A bends in first direction F1 from central portion 23 while lowered left portion 22B bends in second direction F2 from front central portion 23.

Front central portion 23 is covered with painted eye 21. Lowered left portion 22B is mechanically coupled to egg sinker 14. When body 12 is made of a semi-buoyant material, such as wood, body 12 will float. As used in this application, "semi-buoyant" means having a specific gravity less than the water in which one is fishing. Egg sinker 14 causes body to sink slightly, this solves the problem of the metal spoon sinking to fast and requiring precise reeling to avoid sinking. Further, being able to reel a semi-buoyant lure slower helps to avoid fowling the lure in shallow grass. Hook assembly 16 runs through body 12 as shown in more detail in FIG. 4A, FIG. 4B, FIG. 5 and FIG. 6. Hook assembly 16 comprises eye 20 immediately adjacent to shank 19 which is further immediately adjacent to hook 18 which can be used to catch a fish.

While color scheme can vary greatly based on the fish pursued, the following is an exemplary color scheme. Raised right portion 22A and lowered left portion 22B are a first color. Front central portion 23 is a second color. Rear central portion 24 is a third color. Painting a lure with this four color scheme has shown excellent results in shallow water.

As noted in the background section, prior to the disclosed invention spoons were made from metal, and no theory to make spoons from semi-buoyant material was found. FIG. 2, FIG. 3A, FIG. 3B, FIG. 4A, FIG. 4B, FIG. 5 and FIG. 6 present an embodiment of a method that solves this problem.

Turning to FIG. 2, a user can take block of material 25 which can be wood or any other semi-buoyant material and make an S-shaped first cut line 26A on a first side. The user can then cut a band saw along S-shaped first cut line 26A and, turning to FIGS. 4A and 4B, at this point, the user has bifurcated block 25 into two blocks: upper block 32A and lower block 32B. This can be used to form hook assembly 16. To do so the user compresses upper block 32A into shank 19 and lower block 32B this bends shank 19 into an S-shape that will match up with groove 28 as shown below.

Returning to FIG. 2, the user then makes an egg shaped cut line 26B on a second side. The user can then cut a band saw along egg shaped cut line 26B to cut body 12 from either upper block 32A or lower block 32B. Of course, there is no need to conserve material and this can be done in any efficient manner.

Turning to FIG. 3A and FIG. 3B, the user can then cut groove 28 onto body 12 which will be used to accommodate hook assembly 16 as shown in FIG. 4A, FIG. 4B and FIG. 5. Next the user can cut pocket 30 which can accommodate egg sinker 14 as shown in FIG. 5 and FIG. 6. Groove 28 should not go through body 12, but pocket 30 should.

Turning to FIG. 5 and FIG. 6, hook assembly 16 is attached to egg sinker 14 which is inserted into groove 28 and then covered by epoxy 34 sealing hook assembly 16 into groove 28. Egg sinker 14 is an exemplary weight. Raised right portion 22A, lowered left portion 22B, Front central portion 23 and Rear central portion 24 can be painted as desired.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A spoon fishing lure configured to catch fish in shallow water without becoming entangled in grass, the spoon fishing lure comprising,
   a body which includes a raised right portion immediately adjacent to front central portion and rear central portion where both the front central portion and the rear central portion are immediately adjacent to a lowered left portion wherein, the body is shaped to efficiently travel through the grass in the shallow water;
   a hook assembly mechanically coupled to the body and further comprising an eye immediately adjacent to a shank which is further immediately adjacent to a hook wherein the eye can be tethered to a line and the hook can catch the fish;
   the body is made of a semi-buoyant material and the lowered left portion is mechanically coupled to a weight causing the body to sink slightly in the shallow water without precision reeling making the spoon fishing lure easier to use.

2. The spoon fishing lure of claim 1, wherein the raised right portion and the lowered left portion are a first color; the front central portion is a second color; and the rear central portion is a third color to attract the fish in the shallow water.

3. The spoon fishing lure of claim 1, wherein the body is made from wood.

4. A method of making a spoon fishing lure that can attract and catch fish in shallow water, the method comprising
   drawing an S-shaped first cut line on a first side of a semi buoyant block of material;
   drawing an egg shaped cut line on a second side of the block of material;
   cutting along the S-shaped first cut line making two blocks;
   forming a hook assembly with the two blocks;
   creating a body by cutting along the egg shaped cut line on the second side of the block of material;
   cutting a groove into the body sufficiently wide to accommodate the hook assembly;
   boring a pocket into the body sufficiently large to accommodate a weight;
   inserting the weight onto the hook assembly and inserting the hook assembly into the groove such that the weight fits into the pocket; and
   sealing the hook assembly into the body, whereby said lure is shaped to efficiently travel through grass in shallow water without precision reeling.

5. The method of claim 4, further comprising, painting the body.

6. The method of claim 4, wherein the block of material is made from wood.

\* \* \* \* \*